Aug. 29, 1967    E. P. VILKAS    3,339,040
HOLE FINDER DEVICE
Filed Feb. 10, 1966    2 Sheets-Sheet 1
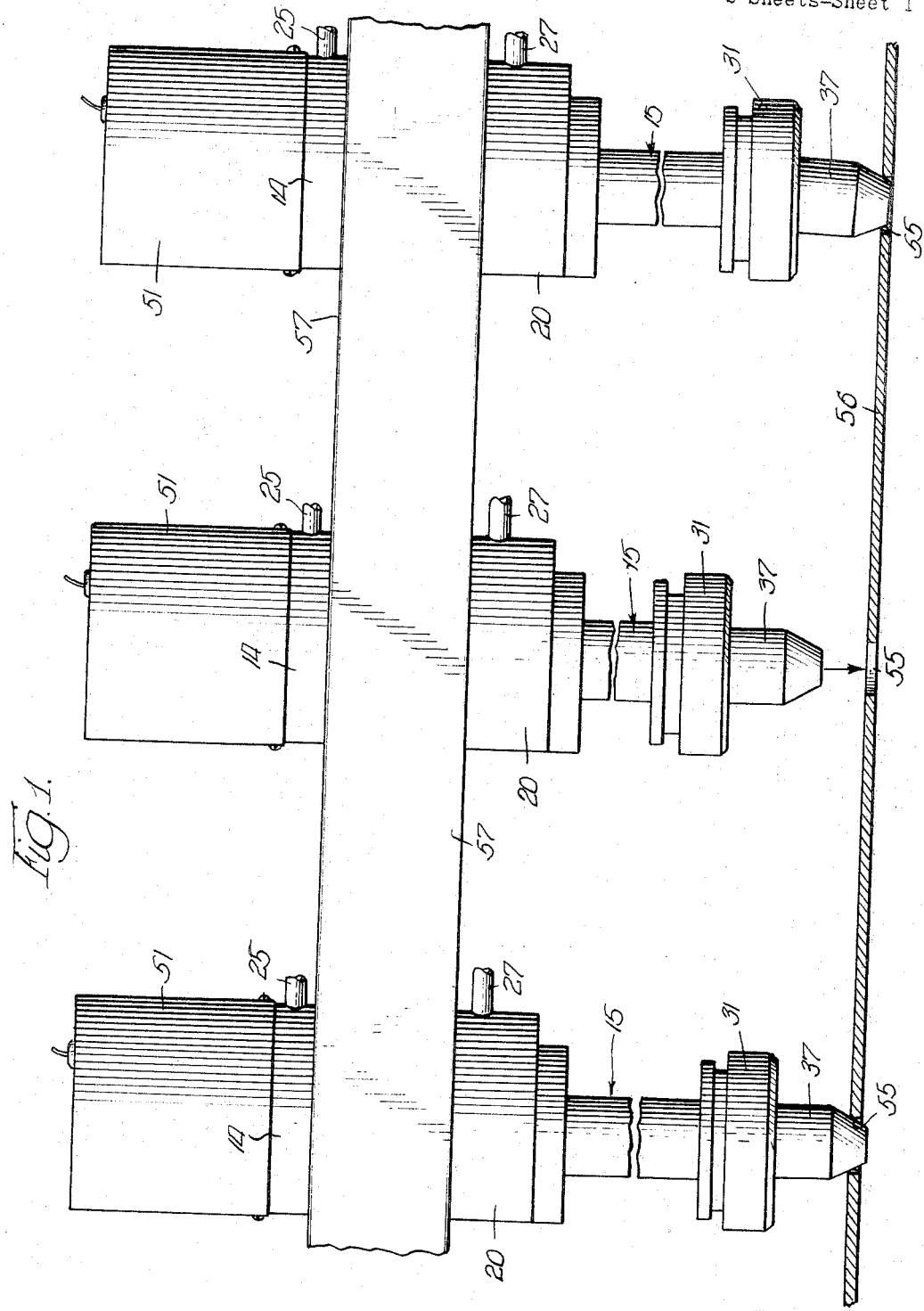
Inventor:
Eugene P. Vilkas,
By Hume Groen Clements Hume
Attys.

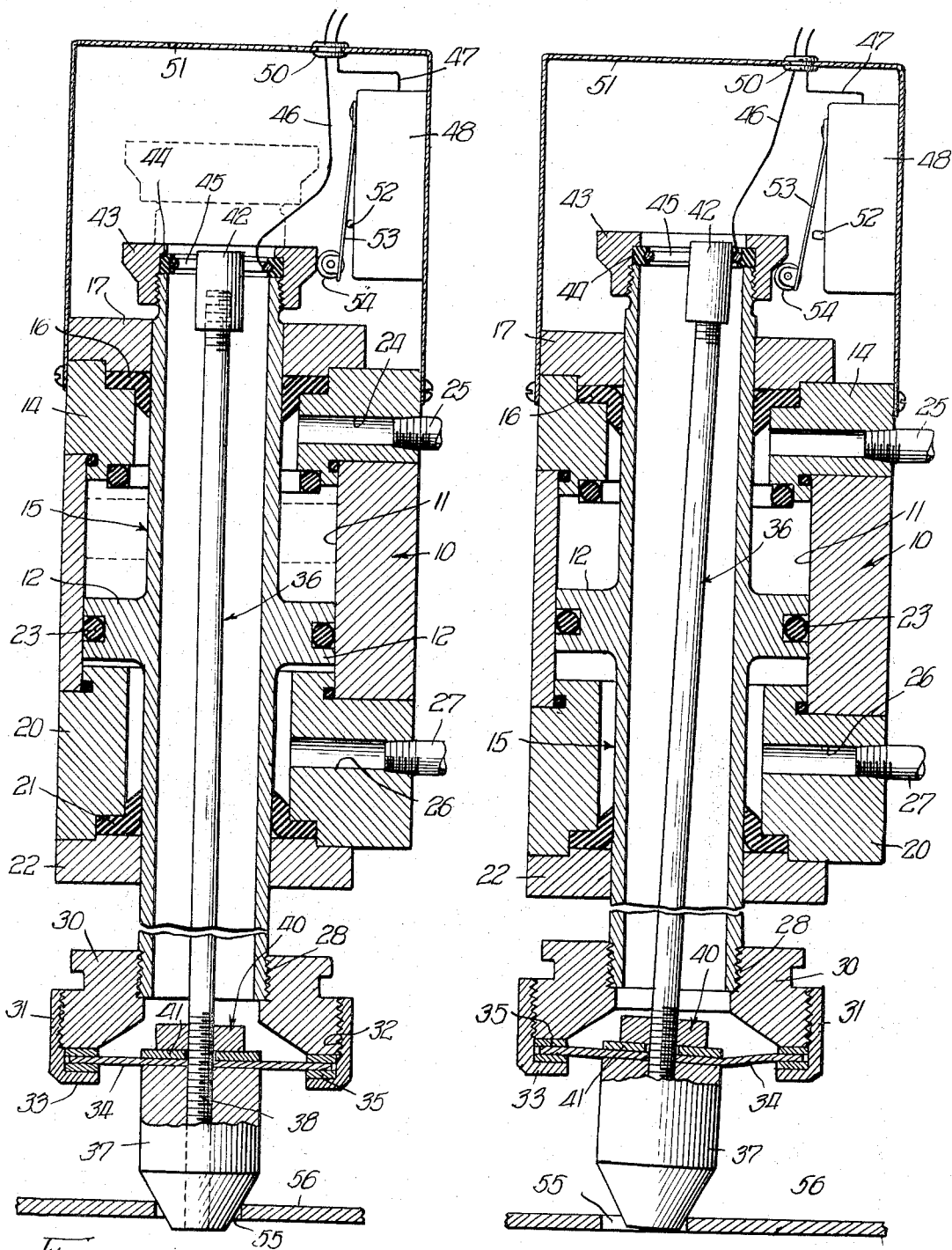

United States Patent Office 3,339,040
Patented Aug. 29, 1967

3,339,040
HOLE FINDER DEVICE
Eugene P. Vilkas, Chicago, Ill., assignor to Welding Research, Inc., Chicago, Ill., a corporation of Illinois
Filed Feb. 10, 1966, Ser. No. 526,418
8 Claims. (Cl. 200—61.41)

The invention relates to a combination mechanical and electrical device for detecting openings in sheet material and has reference in particular to devices of this nature which will detect punched openings in sheet material and electrically indicate whether the openings are in proper or improper position or whether no opening has been punched at all.

An object of the invention resides in the provision of a piston reciprocated indicator rod which when moved downwardly will complete its stroke if the hole being checked is in proper position, thus permitting the indicator rod to fully enter the hole. However, in the event the opening is not properly positioned, the indicator rod will be deflected and in accordance with the invention an electrical signal will be given notifying the operator of the improperly positioned opening provided its off-center position exceeds the outside limits which have been set up.

A more specific object of the invention is to provide a hole finder device essentially consisting of a piston actuated indicator rod carried by a relatively thin metal diaphragm. The diaphragm is sufficiently flexible to permit the rod to deflect should it enter an opening that is not properly positioned.

Another object is to provide a hole finder device of the character described which will give one electrical signal for indicating the presence of an opening that is accurately aligned with the indicator rod and thus properly positioned and which will give a second distinguishing signal for indicating an opening that is positioned off-center beyond a certain selected range.

With these and various other objects in view, the invention may consist of certain novel features of construction and operation as will be more fully described and particularly pointed out in the specification, drawings and claims appended thereto.

In the drawings which illustrate an embodiment of the device and wherein like reference characters are used to designate like parts—

FIGURE 1 is an elevational view showing a plurality of hole finder devices mounted on a test fixture and operative for detecting openings in a metal sheet;

FIGURE 2 is a vertical sectional view taken longitudinal of a hole finder device embodying the improved features of the invention; and FIGURE 3 is a longitudinal sectional view similar to FIGURE 2 but showing the deflected position of the detector rod for signalling the presence of an opening that is improperly positioned.

In FIGURES 2 and 3 the hole finder device of the invention is illustrated as including a cylinder 10 of metal or the like having a central bore 11 for accommodating a piston 12. The cylinder on its top surface is substantially closed by the top member 14 conveniently bolted or otherwise secured to the cylinder and which is apertured centrally for allowing the hollow piston rod 15 to project through. The top member 14 carries the annular sealing collar 16 of rubber or similar resilient material for sealing the top member with respect to the hollow piston rod. A closure plate 17 is secured to the top member for holding the sealing collar 16 in place and it will be observed that the closure plate is also apertured centrally for a close fit with the hollow piston rod which extends through and projects above the closure plate.

The open bottom end of the cylinder 10 is substantially closed by the bottom member 20 which is secured to the cylinder and which is also centrally apertured for receiving the hollow piston 15. The sealing collar 21 of rubber or other suitable resilient material is mounted on the bottom member and the collar has sealing contact with the hollow piston. A closure plate 22 is secured to the bottom member and said closure plate retains the collar in position and is centrally apertured similar to closure plate 17 so that the piston rod may pass through and extend below for purposes to be presently described.

The piston 12 may carry a ring 23 of resilient material for improving the seal between the piston walls and the walls of the bore 11. For producing movement of the piston and thus reciprocating movement of the hollow piston rod, the top member 14 is formed with a passage 24 which communicates with the bore 11 above the piston 12. Compressed air or other fluid under pressure is admitted and exhausted from the space above the piston by means of the connecting pipe 25. The bottom member 20 is also provided with a passage 26 in communicating relation with the bore 11 below the piston 12. Compressed air or other fluid under pressure is admitted and exhausted from the space below the piston by means of the connecting pipe 27.

The end of the piston rod 15 extending below the bottom closure 22 has threaded connection at 28 with the retaining member 30. The flanged collar 31 is threaded at 32 to the retaining member 30 and the inwardly directed flange 33 of the collar locks in place the relatively thin metal diaphragm 34. The diaphragm is frictionally gripped around its periphery by the inserts 35 and centrally of the diaphragm the detector rod 36 and the hole finder 37 are secured. For conveniently securing the hole finder 37 and the detector rod 36 to the diaphragm, the hole finder is threaded at 38 to the detector rod below the diaphragm and the locking ring 40 is threaded to the rod above the diaphragm. When the locking ring 40 is tightened down on the metal inserts 41 the diaphragm is clamped between the inserts and the hole finder. Since the diaphragm is secured around its periphery, the detector rod and the hole finder are supported in a manner permitting lateral deflection. To facilitate such lateral deflection the diaphragm is relatively thin so as to have some flexibility and for such purposes a diaphragm of beryllium copper has been found most satisfactory.

The detector rod 36 extends upwardly through the hollow piston 15 and the said rod carries at its extreme upper end the metal contact member 42. At the adjacent upper end of the hollow piston rod the collar 43 is threaded to the exterior of the piston rod and the collar clamps in place the insulating member 44 which carries the metal contact ring 45. When the member 42 contacts the ring, an electrical signal is produced by means of the conductors 46 and 47 and the limit switch 48. The conductor 46 connects with the ring 45, whereas the conductor 47 connects with the limit switch 48. Both conductors pass through the ring opening 50 in the housing part 51 and the conductors electrically connect with the signal analyzer.

Further electrical signals employing the limit switch 48 are contemplated by the invention, for which purpose the limit switch is provided with the push buttom 52. The switch actuating lever 53 is fixed at one end to the limit switch and said lever at its free depending end carries the roller 54. For actuating the lever 53, the outside periphery of the collar 43 is stepped or angled so that when the piston rod has fully completed its stroke in a downward direction the enlarged top portion of the collar will move the lever to the right and depress the push button to thereby effect an electrical signal. Since the piston rod has moved down to its full extent, this means that the hole finder 37 has entered an opening which was properly aligned therewith and thus properly positioned. A signal obtained by depressing the push button 52 thus informs the operator of this fact. The position of the parts when such a signal is produced is shown in FIGURE 2.

When the hole finder is unable to fully enter an opening, the piston rod does not complete its stroke in a downward direction and the push button 52 is not actuated. In the absence of a signal as given by the push button or if a "no go" signal is given the operator is informed that either the opening such as 55, FIGURE 3, in the metal sheet 56 is misaligned and improperly positioned or that no punched opening exists in the sheet at all.

When the push button 52 is not actuated to produce an electric signal, a distinguishing signal may be produced by the contact member 42. When the opening 55 is misaligned or off center by an amount which is outside the limits set by the device, the rod 36 will be deflected laterally so as to cause the member 42 to contact the ring 45. This closes an electrical circuit and a signal is given to the operator. It is possible to vary the range of off-center openings which will cause the member to contact the ring by using a larger diameter or a smaller diameter member 42 or said member may be cone-shaped and its position on the rod 36 adjustable.

FIGURE 1 illustrates a commercial arrangement of the hole finder device of the invention wherein a plurality of such devices are carried in a fixed spaced relation by means of a test fixture 57. The sheet material, having the punched openings, is located below the hole finder devices and by actuation of the piston and piston rod combination of the said devices the hole finder 37 is actuated to detect an opening in the material. Since errors may occur in the punching of the openings in the material these may be detected by the arrangement of the hole finding devices as disclosed. They will produce signals if the location or position of the punched opening is off center beyond desirable tolerances, or if the hole punching operation is incomplete or if the hole is missing the operator is informed of this fact by the absence of any signal. Also as well understood in the electrical art a "no-go" signal could be produced in the event the hole is incomplete or missing and such a signal would inform the operator of these facts.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a device for detecting an opening in a sheet of material, the combination with a power cylinder for reciprocating a piston, of a hollow piston rod actuated by the piston and projecting from respective ends of the power cylinder, one projecting end of the hollow piston rod retaining a relatively thin and flexible diaphragm and which is secured around its periphery to the said piston rod, a hole finder member fixed to the diaphragm approximately centrally thereof and extending on one side of the diaphragm, a detector rod also fixed in the diaphragm and extending from the other side of the diaphragm axially through the hollow piston rod, a contact member carried by the terminal end of the detector rod, and a contact ring carried within the hollow piston rod at the end adjacent the terminal end of the detector rod, whereby the hole finder when detecting an opening, which is off-center beyond a critical range with respect to the longitudinal axis of the hollow piston rod, will cause the detector rod to deflect laterally a sufficient extent to cause the contact member to engage the contact ring.

2. A device for detecting an opening in a sheet of material as defined by claim 1, wherein the diaphragm is secured around its periphery to the piston rod by means of a retaining member of larger diameter than the hollow piston rod and which is fixed to the said one projecting end of the piston rod, a flanged collar fixed to the retaining member, and said diaphragm being gripped around its periphery between the retaining member and the flange of said flanged collar.

3. A device for detecting an opening in a sheet of material as defined by claim 1, wherein the diaphragm is formed of beryllium copper.

4. A device for detecting an opening in a sheet of material as defined by claim 2, wherein the diaphragm is formed of beryllium copper.

5. A device for detecting an opening in a sheet of material as defined by claim 1, additionally including a collar carried by the hollow piston rod exteriorly thereof and relatively adjacent the contact ring, said collar having stepped exterior surfaces, an electrical limit switch, and an actuating lever for the limit switch adapted to be actuated by a stepped surface of the collar when the piston rod completes a full stroke as permitted by the hole finder when an aligned and thus a properly positioned opening has been located.

6. A device for detecting an opening in a sheet of material as defined by claim 2, additionally including a collar carried by the hollow piston rod exteriorly thereof and relatively adjacent the contact ring, said collar having stepped exterior surfaces, an electrical limit switch, and an actuating lever for the limit switch adapted to be actuated by a stepped surface of the collar when the piston rod completes a full stroke as permitted by the hole finder when an aligned and thus a properly positioned opening has been located.

7. In a device for detecting an opening in a sheet of material, the combination with a power cylinder for reciprocating a piston, of a hollow piston rod actuated by the piston and projecting from the respective ends of the power cylinder, a relatively flexible diaphragm secured around its periphery to the lower depending end of the piston rod, a hole finder fixed centrally of the diaphragm and depending from the same, a detector rod fixed centrally to the diaphragm and extending axially through the hollow piston rod to the upper terminal end thereof, a contact member fixed to the upper end of the detector rod, a contact ring carried within the hollow piston rod at a location laterally adjacent the said contact member, and a signal circuit in electrial connection with the contact member and contact ring respectively, whereby a signal is given when the contact member is caused to engage the contact ring due to deflection of the detector rod.

8. A device for detecting an opening in a sheet of material as defined by claim 7, additionally including a collar having stepped exterior surfaces and which is fixed to the exterior of the piston rod adjacent the upper terminal end of the piston rod, and a switch actuated lever positioned for actuation by one of the stepped surfaces of the collar when the piston rod has a full downward stroke by reason of the whole finder entering an aligned and properly positioned opening.

References Cited

UNITED STATES PATENTS

| | | | |
|---|---|---|---|
| 2,090,178 | 8/1937 | Brickner | 200—61.42 |
| 3,053,948 | 9/1962 | Figenshau | 200—61.42 |
| 3,161,729 | 12/1964 | Suozzo | 200—61.52 |

BERNARD A. GILHEANY, *Primary Examiner.*

H. B. GILSON, *Assistant Examiner.*

UNITED STATES PATENT OFFICE
CERTIFICATE OF CORRECTION

Patent No. 3,339,040　　　　　　　　　　　　　　　　　　August 29, 1967

Eugene P. Vilkas

It is certified that error appears in the above identified patent and that said Letters Patent are hereby corrected as shown below:

Column 1, lines 49 and 50, "longitudinal" should read -- longitudinally --. Column 4, line 67, "3,161,729" should read -- 3,161,739 --.

Signed and sealed this 12th day of August 1969.

(SEAL)

Attest:

Edward M. Fletcher, Jr.　　　　　　　　　　　WILLIAM E. SCHUYLER, JR.
Attesting Officer　　　　　　　　　　　　　　　　Commissioner of Patents